United States Patent
Angeles et al.

(10) Patent No.: US 9,408,261 B2
(45) Date of Patent: Aug. 2, 2016

(54) DIMMER DETECTOR FOR BLEEDER CIRCUIT ACTIVATION

(71) Applicant: Power Integrations, Inc., San Jose, CA (US)

(72) Inventors: Christian Pura Angeles, San Jose, CA (US); Marvin C. Espino, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 125 days.

(21) Appl. No.: 14/246,770

(22) Filed: Apr. 7, 2014

(65) Prior Publication Data

US 2014/0333228 A1     Nov. 13, 2014

Related U.S. Application Data

(60) Provisional application No. 61/820,588, filed on May 7, 2013.

(51) Int. Cl.
| | |
|---|---|
| *H05B 33/08* | (2006.01) |
| *H02M 7/155* | (2006.01) |
| *H02M 7/217* | (2006.01) |
| *H02M 1/00* | (2006.01) |

(52) U.S. Cl.
CPC ......... *H05B 33/0815* (2013.01); *H02M 7/1557* (2013.01); *H02M 7/2176* (2013.01); *H05B 33/0809* (2013.01); *H05B 33/0845* (2013.01); *H02M 2001/0022* (2013.01)

(58) Field of Classification Search
CPC ........... H05B 33/0815; H05B 33/0809; H05B 33/0839; H05B 33/0812; H05B 33/0818; H05B 33/0803; H05B 41/28; H05B 41/19; H05B 41/2855; H02M 7/1557; H02M 7/2176
USPC ........ 315/291, 307, 308, 185 R, 360, DIG. 4, 315/224, 219, 200 R
See application file for complete search history.

(56) References Cited

U.S. PATENT DOCUMENTS

| | | | | |
|---|---|---|---|---|
| 4,465,966 | A * | 8/1984 | Long .......................... | G06F 1/13 323/326 |
| 6,448,713 | B1 * | 9/2002 | Farkas et al. ................... | 315/291 |
| 8,664,885 | B2 * | 3/2014 | Koolen ............. | H05B 33/0815 315/225 |
| 9,198,250 | B2 * | 11/2015 | Malyna .............. | H05B 33/0815 |
| 2014/0009082 | A1 * | 1/2014 | King et al. .................... | 315/247 |

\* cited by examiner

*Primary Examiner* — Haissa Philogene
(74) *Attorney, Agent, or Firm* — Blakely Sokoloff Taylor & Zafman LLP

(57) ABSTRACT

A circuit to be utilized for an LED driver bleeder activation. The circuit comprises a circuit block for timing a duration of any removed portion of a rectified line signal. The input of the circuit to be coupled to receive the phase controlled rectified line signal through a voltage divider. Comparing the divided rectified line signal with a threshold voltage and output a comparison result. A timer coupled to the comparator and responsive to the comparison result to time the duration of the removed portion of the rectified line signal and activate the bleeder activation circuitry to turn on the switching element of the bleeder to sink a controlled current from the input line.

6 Claims, 5 Drawing Sheets

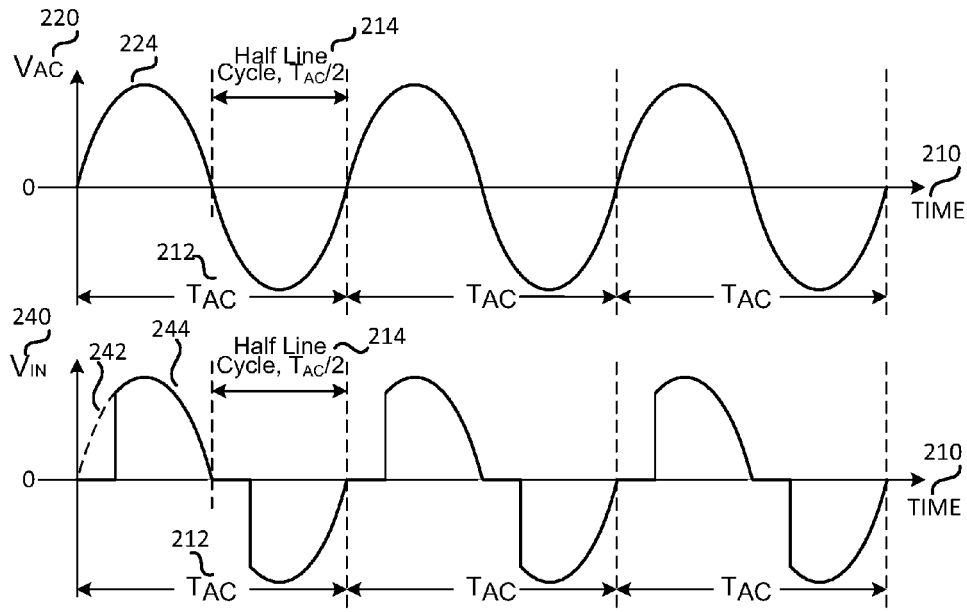
FIG. 2  LEADING EDGE PHASE CONTROL
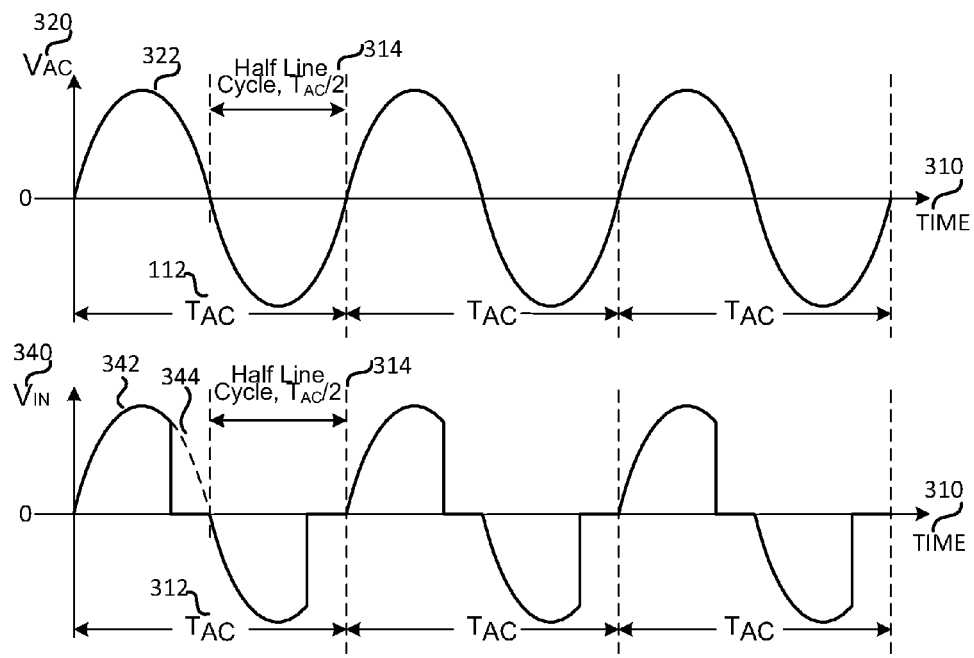
FIG. 3  TRAILING EDGE PHASE CONTROL

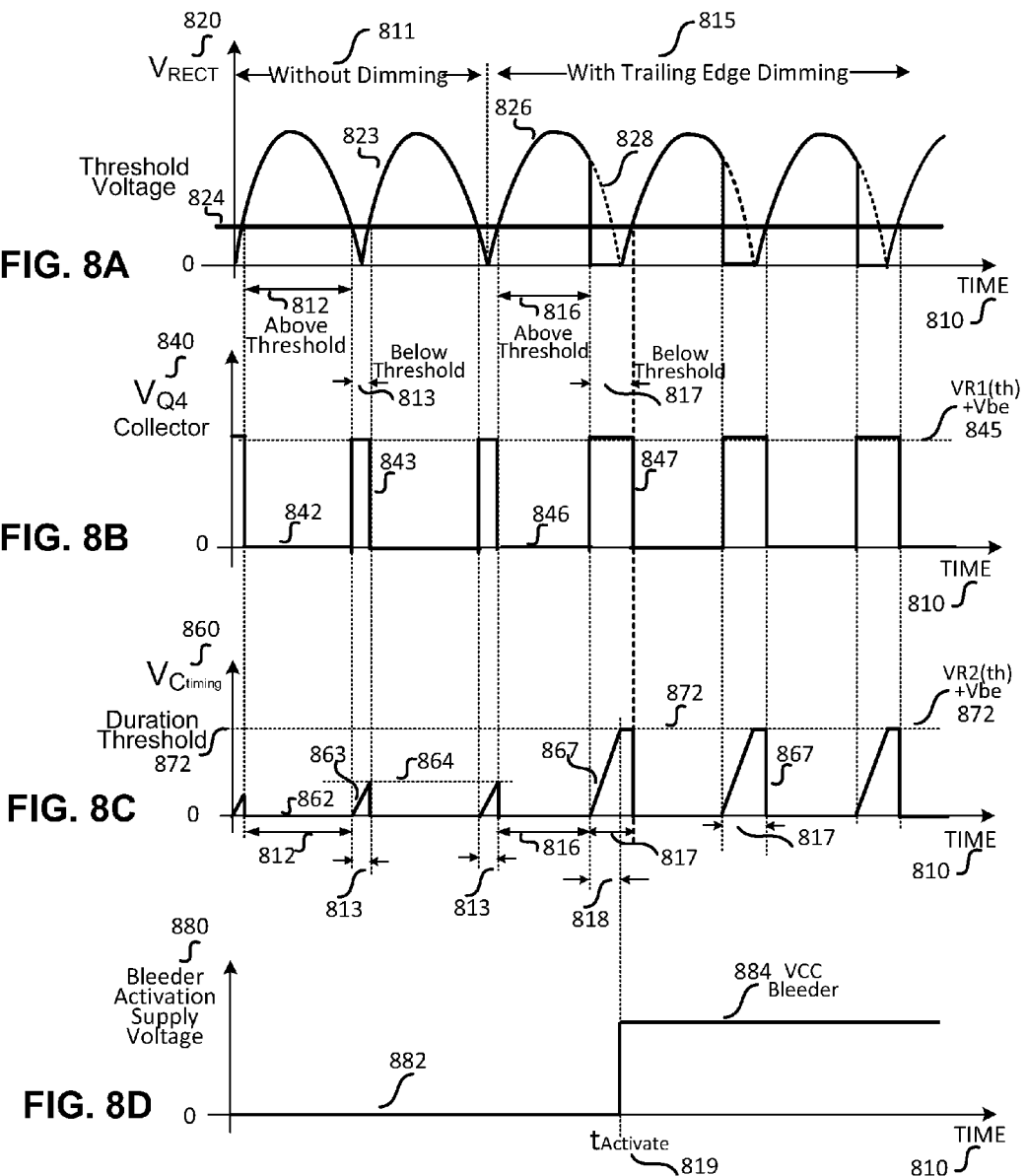

DIMMER DETECTOR FOR BLEEDER CIRCUIT ACTIVATION

CROSS-REFERENCE TO RELATED APPLICATION

This application claims the benefit of U.S. Provisional Application No. 61/820,588, filed May 7, 2013.

TECHNICAL FIELD

The present disclosure relates generally to circuits for driving light-emitting diodes (LEDs) and, more specifically, to LED driver circuits having phase-angle dimming circuitry.

BACKGROUND

LED lighting has become popular in the industry due to the many advantages that this technology provides. For example, LED lamps typically have a longer lifespan, pose fewer hazards, and provide increased visual appeal when compared to other lighting technologies, such as compact fluorescent lamp (CFL) or incandescent lighting technologies. The advantages provided by LED lighting have resulted in LEDs being incorporated into a variety of lighting technologies, televisions, monitors, and other applications.

It is often desirable to implement LED lamps with a dimming functionality to provide variable light output. One known technology that has been used for analog LED dimming is phase angle dimming. In phase angle dimming a portion of the ac or rectified line voltage (or as referred hereafter, the line signal) is removed. The portion which is removed can be at the beginning or at the end of each line signal. In a known example, a Triac circuit can be used to remove a beginning or end portion of each line signal (half-cycle) of alternating current (ac) power, which is known as "phase control." By removing a portion of each half-cycle, the amount of power delivered to the load (e.g., the LED lamp) is reduced, producing a dimming effect in the light output by the lamp. In most applications, the delay in the beginning of each half-cycle is not noticeable to the human eye because the variations in the phase controlled line voltage and the variations in power delivered to the lamp occur so quickly. For example, Triac dimming circuits work especially well when used to dim incandescent light bulbs since the variations in phase angle with altered ac line voltages do not lead to an undesirable flicker effect on the output light of these types of bulbs. However, flicker may be noticed when Triac circuits are used for dimming LED lamps.

Flickering in LED lamps can occur because these devices are typically driven by LED drivers having regulated power supplies that provide regulated current and voltage to the LED lamps from ac power lines. Unless the regulated power supplies that drive the LED lamps are designed to recognize and respond to the voltage signals from Triac dimming circuits in a desirable way, the Triac dimming circuits are likely to produce non-ideal results, such as limited dimming range, flickering, blinking, and/or color shifting in the LED lamps.

The difficulty in using Triac dimming circuits with LED lamps is in part due to a characteristic of the Triac itself. Specifically, a Triac is a semiconductor component that behaves as a controlled ac switch. The Triac behaves as an open switch to an ac voltage until it receives a trigger signal at a control terminal, causing the switch to close. The switch remains closed as long as the current through the switch is above a value referred to as the "holding current." Most incandescent lamps constantly draw more than the minimum holding current from the ac power source to enable reliable and consistent operation of a Triac. However, the comparably low currents drawn by LEDs from efficient power supplies may not meet the minimum holding currents required to keep the Triac switches conducting for reliable operation. As a result, the Triac may trigger inconsistently. In addition, due to the inrush current charging the input capacitance and because of the relatively large impedance that the LEDs present to the input line, a significant ringing may occur whenever the Triac turns on. This ringing may cause even more undesirable behavior as the Triac current may fall to zero and turn off the string of LEDs, resulting in a flickering effect.

To address these issues, conventional LED driver designs typically rely on current drawn by a dummy load or "bleeder circuit" of the power converter to supplement the current drawn by the LEDs in order to draw a sufficient amount of current even when a portion of the rectified line signal is removed.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 2 shows example ac waveforms at the input of an LED driver with a leading-edge phase controlled dimmer.

FIG. 3 shows example ac waveforms at the input of an LED driver with a trailing-edge phase controlled dimmer.

FIGS. 8A-8D illustrate timing diagrams of example control signals for a non-dimming and a trailing-edge dimming of the input line signal.

DETAILED DESCRIPTION

In the following description, numerous specific details are set forth in order to provide a thorough understanding. It will be apparent, however, to one having ordinary skill in the art that the specific details need not be employed.

As mentioned above, conventional LED driver designs typically rely on current drawn by a dummy load or "bleeder circuit" of the power converter to supplement the current drawn by the LEDs in order to draw a sufficient amount of current even when a portion of the rectified line signal is removed. This keeps the Triac conducting reliably after it is triggered. Accordingly, embodiments provided herein include dimmer detector that detect the removed portion of the rectified line signal. The active bleeder presented in this application may sink a variable current in response to the removed portion of the rectified line signal for an optimum effect on performance/behavior (efficiency, shimmer/blinking and waveforms) of the LED driver in different applications (different power range).

The dimmer detector for bleeder circuit activation presented in this application detects the timing of the missing portion of the rectified line signal for controlling a switching element of a variable current dimmer to provide improved LED driver performance, reduce shimmer/blinking, and increase efficiency in LED driver designs.

Various examples are directed to a control circuitry for a bleeder at input circuitry of a phase-dimming LED driver. The bleeder control has a circuit for timing a duration of any removed portion of a rectified line signal and activating a variable current bleeder in response to the removed portion of the rectified line signal to improve the LED driver performance and improve operation by reducing shimmer/blinking and increasing efficiency of the LED driver.

Figure 1:
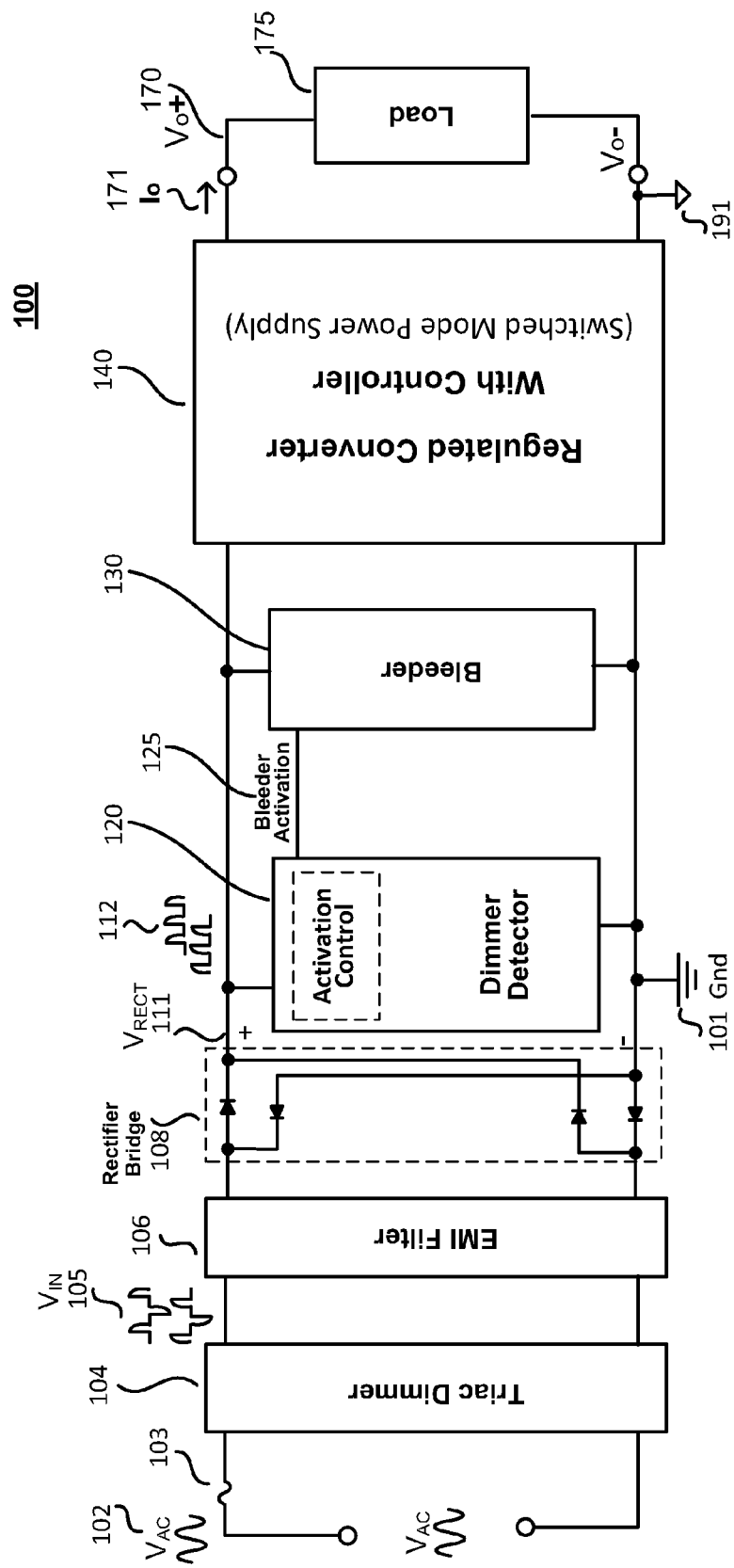
FIG. 1 shows a general block diagram of an offline LED driver with phase control, the dimmer detector, and activation control for the bleeder.

FIG. 1 shows a general block diagram of an example LED driver system 100. LED driver system 100 includes a regulated converter with a controller 140 that is coupled to the output terminals to provide output voltage $V_o$ 170 and output current $I_o$ 171 to the load 175. In some instances, the load is an array of LEDs. In the illustrated embodiment, a pre-stage Triac dimming circuit 104 is coupled to receive an input ac line full wave sinusoidal signal $V_{AC}$ 102 at the input terminals of LED driver system 100 through a fusible protection device 103. Triac dimmer circuit 104 may apply leading-edge phase control by removing the beginning of each half-cycle of input ac line signal $V_{AC}$ 102 or may apply trailing-edge phase control by trimming the end of each half-cycle of input ac line signal $V_{AC}$ 102 to produce a phase-controlled ac line/input signal or a phase-controlled Triac signal $V_{IN}$ 105. By removing a portion of each half-cycle of the input ac line signal $V_{AC}$ 102 using Triac dimmer circuit 104, the amount of power delivered to the load 175 (e.g., a lamp or LED array) is reduced. When the load includes an LED, the light output by the LED is dimmed.

LED driver system 100 may further include bridge rectifier 108 coupled to receive the phase-controlled input signal $V_{IN}$ 105 through the electromagnetic interference (EMI) filter 106. As shown in the depicted example, the phase-controlled rectified voltage $V_{RECT}$ 111 (represented by symbolic waveforms, either leading-edge or trailing-edge 112) produced by the bridge rectifier 108 has a conduction phase angle in each half line cycle that is controlled by Triac dimming circuit 104. The phase-controlled rectified voltage $V_{RECT}$ 111 provides an adjustable average dc voltage to a high frequency regulated converter 140 through input circuitry that, in one example, may include an active bleeder 130 with related circuitry such as a dimmer detector 120. Dimmer detector 120 may control activation of bleeder 130. For example, a bleeder activation signal 125 may control a switching element in active bleeder 130 that then sinks a current through bleeder 130.

The input circuitry at the interface between bridge rectifier 108 and regulated converter 140 may also include more interface devices/blocks, such as sense/detect circuitry, dampers, and inductive and/or capacitive filters. In one embodiment, if the regulated converter 140 is isolated, then the output reference ground 191 may be shifted relative to the input reference ground 101. Non-limiting examples of isolated converters include Flyback and forward converters. Non-limiting examples of non-isolated converters include non-isolated Buck-Boost converters, Buck converters, and Tapped Buck converters with a switch and/or an inductor on the return line that may result in an output ground 191 that is level-shifted from the input ground 101.

FIG. 2 shows an example of a leading-edge phase-controlled ac input voltage (lower diagram $V_{IN}$ 240) derived from a full sinusoidal AC voltage waveform (upper diagram $V_{AC}$ 220). The horizontal axis represents time 210 with each line cycle period $T_{AC}$ 212 and a half-line cycle $T_{AC}/2$ 214. A portion of the full sinusoidal AC voltage 224 at the beginning of each half-line cycle is removed (dashed portion 242). The remaining conducted portion 244 delivers a reduced power to the LED load.

In contrast with FIG. 2, FIG. 3 illustrates an example of a trailing-edge phase-controlled AC input voltage (lower diagram $V_{IN}$ 340) derived from a full sinusoidal AC voltage waveform (upper diagram $V_{AC}$ 320). The horizontal axis represents time 310 with each line cycle period $T_{AC}$ 312 and a half-line cycle $T_{AC}/2$ 314. A portion of the full sinusoidal AC voltage 322 at the end of each half-line cycle is removed (dashed portion 344). The remaining conducted portion 342 delivers a reduced power to the LED load.

Figure 4:
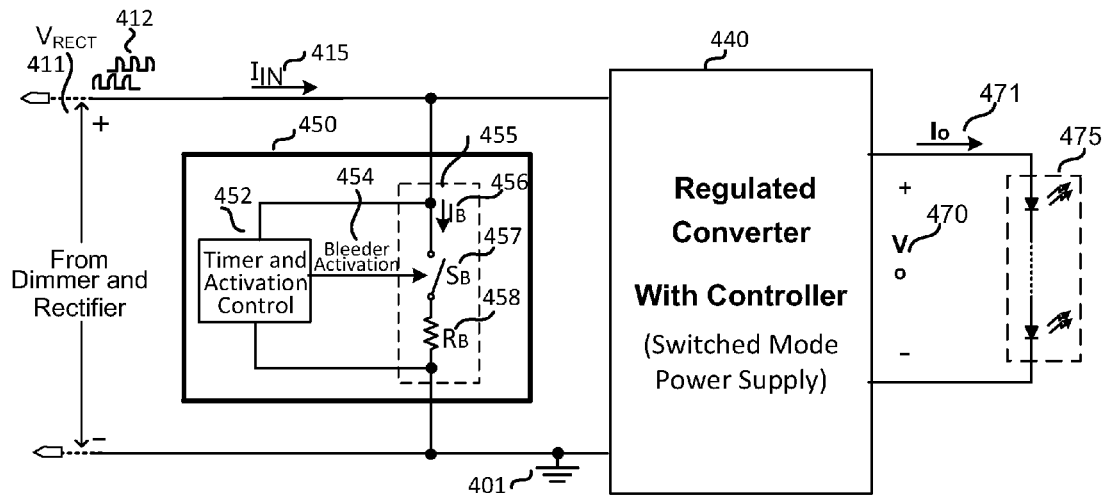
FIG. 4 is a schematic representation of bleeder control by the timer and activation control block.

FIG. 4 is a schematic representation of bleeder control by the timer and activation control block 452. The phase controlled rectified voltage $V_{RECT}$ 411 (from a dimmer and a rectifier), which is either leading-edge or trailing edge dimmed (412), is coupled to the regulated converter 440. Output voltage $V_o$ 470 and current $I_o$ 471 feed the load 475. At the input of regulated converter 440, the phase controlled rectified voltage $V_{RECT}$ 411 is applied to a module 450. Module 450 includes an active bleeder 455 and a timer and activation control unit 452. Timer and activation control unit 452 receives and processes phase controlled rectified voltage $V_{RECT}$ 411 and generates bleeder activation signal 454 to control conduction through the bleeder active switch $S_B$ 457. In particular, bleeder active switch $S_B$ 457 conducts a variable bleeding current $I_B$ 456 that sinks and dissipates through a bleeder resistor $R_B$ 458.

Figure 5A:
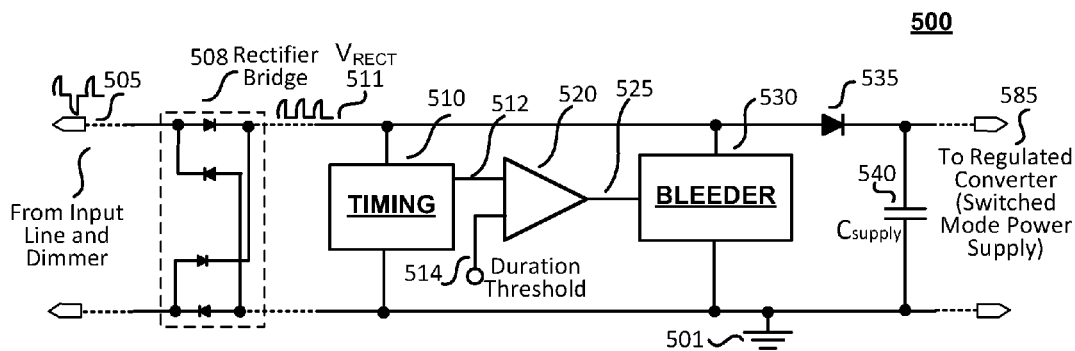
FIG. 5A shows a timing block activating the bleeder at a duration threshold.

FIG. 5A shows a timing block 510 activating the bleeder 530 at a duration threshold. It depicts a general overview of implementation blocks for dimmer detection by timing a duration of any removed portion of a rectified line signal (rectified phase-controlled input voltage). From an input line and a dimmer, the ac line signal 505 is applied to the bridge rectifier 508. The rectified phase-controlled input voltage $V_{RECT}$ 511 is applied to the timing circuit 510. Timing circuit 510 generates a timing signal 512 representing the duration of any removed portion of the rectified line signal. The timing signal 512 is compared to a duration threshold 514 by comparator 520 which outputs a comparison signal 525. It is appreciated that output comparison signal 525 can go high for either the timing signal 512 going above the duration threshold 514 or the timing signal 512 going below the duration threshold 514 based on positive and negative input selection of the comparator 520. The output comparison signal 525 activates the bleeder circuit 530 to sink a current to keep the input current above the holding current of the Triac. Diode 535 and supply capacitor $C_{supply}$ 540 form a supply voltage referenced to ground 501 for the circuitry in the timing block 510 and comparator 520. Output terminal 585 can be coupled to the regulated converter (e.g., a switched mode power supply) (140 in FIG. 1).

Figure 5B:
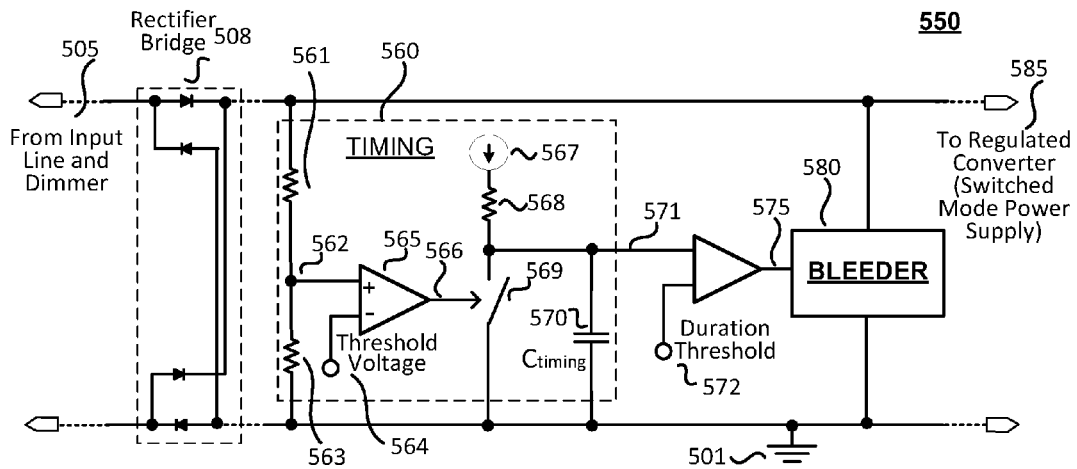
FIG. 5B shows an example function block of a timing block for activation of the bleeder.

FIG. 5B shows an example schematic of functional blocks of a timing block for activation of the bleeder. In particular, a timing capacitor $C_{timing}$ 570 is linearly charged by constant current source 567 through a resistor 568. As long as the bypassing switch 569 is open (i.e., in the OFF state), the voltage across timing capacitor $C_{timing}$ 570 rises linearly. The rectified line signal (rectified phase-controlled input voltage) from rectifier 508 is applied across a resistive divider that includes resistors 561 and 563. The scaled rectified line signal 562 is compared to a threshold voltage 564 by a comparator 565. The output 566 of comparator 565 provides the enabling signal to control bypass switch 569 (i.e., to turn ON/close and turn OFF/open bypass switch 569). As long as the scaled magnitude of rectified phase-controlled input voltage is below the threshold voltage 564 (in other words, between the zero crossing of the half line cycle sinusoidal voltage and the threshold level depicted in FIG. 8), the output signal 566 of the comparator 565 remains low and the bypassing switch 569 remains open (i.e., in the OFF state). This allows the constant current source 567 to charge the timing capacitor $C_{timing}$ 570 linearly with a constant slope through resistor 568. When the scaled magnitude of the rectified phase-controlled input voltage is above the threshold voltage 564 (in other words, between the threshold level and the peak of sinusoidal variation of the rectified phase-controlled input voltage), the output signal 566 of the comparator 565 is high. The bypassing switch 569 remains closed (i.e., in the ON state). This allows the current output from the constant current source 567 to bypass to ground and the timing capacitor $C_{timing}$ 570 to discharge to zero and reset for the next line half-cycle.

Figure 6:
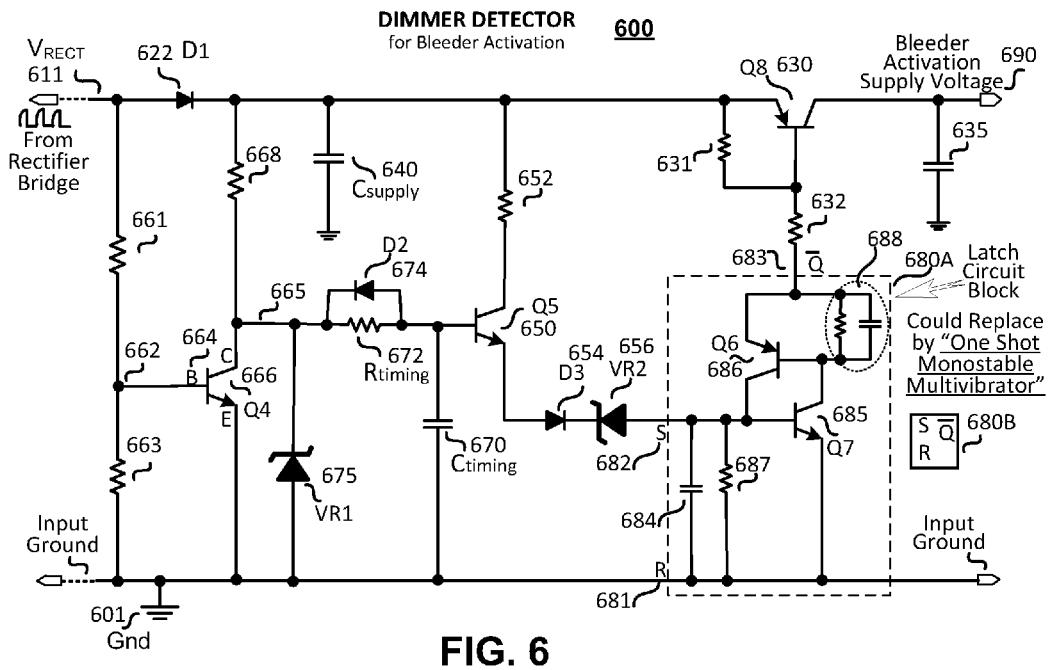
FIG. 6 demonstrates an example circuit schematics of a timing circuit block for the removed portion of the input line voltage.

FIG. 6 demonstrates an example circuit schematic of a timing circuit block for timing the removed portion of the input line voltage. It shows one example of analog circuitry 600 utilized as a dimmer detector for bleeder activation. For example, analog circuit 600 can be used as block 720 in FIG. 7. A bleeder is activated in response to receipt of a supply voltage on terminal 690 from the rectified input voltage $V_{RECT}$ 611 by activation of transistor Q8 630. The phase controlled rectified input voltage $V_{RECT}$ 611 is received from a rectifier bridge and referenced to input ground 601. The resistive divider formed by resistors 661 and 663 at the input terminal of circuitry 600 scales down the phase controlled rectified input voltage $V_{RECT}$ 611 with sinusoidal variation. The scaled phase controlled rectified input voltage $V_{RECT}$ 611 is provided to the base 664 of transistor Q4 666 at node 662. As long as the signal at node 662 is below the base-emitter threshold $V_{be\_th}(Q4)$ of transistor Q4 666 (in FIG. 8A, between zero cross and threshold voltage 824), transistor Q4 666 remains in the OFF state (VQ4 Collector 840 on diagram of FIG. 8B remains in "High State" as shown, e.g. in pulses 843 and 847. During this time, timing capacitor $C_{timing}$ 670 charges nearly linearly (with an almost constant slope as depicted on diagram of FIG. 8C $V_{Ctiming}$ 860) from the phase controlled rectified bus voltage $V_{RECT}$ 611 through diode D1 622 and resistors 668 and 672 ($R_{timing}$). The Zener diode VR1 675 is used to feed a constant clamped voltage on the timing network (formed by $C_{timing}$ 670 and $R_{timing}$ 672) and thus provide a linear ramp of voltage across the timing capacitor $C_{timing}$ 670. Diode D2 674 across the timing resistor $R_{timing}$ 672 provides a fast discharge path for the timing capacitor $C_{timing}$ 670 through transistor Q4 666 when it turns on. When the charged voltage across the timing capacitor $C_{timing}$ 670 reaches the required threshold defined by the Zener threshold of VR2 656, the forward drop of diode D2 654, and the base-emitter threshold of the transistor Q5 650 [$VR2_{\_th}$+$V_{D2\_th}$+$V_{be\_th}(Q5)$], transistor Q5 650 turns on through resistor 652 and diode D3 654 and raises the voltage across the cathode of the Zener diode VR2 656. Zener diode VR2 656 is coupled to the terminal S 682 of the latch circuit block 680A. The latch circuit block 680A may be replaced by a one shot monostable multivibrator module illustrated as 680B. The latch circuit block 680A may generate a pull-down latch signal on terminal $Q^{bar}$ 683 of the latch circuit block 680A to activate transistor Q8 630 and provide a bleeder activation supply voltage on terminal 690 across capacitor 635. This results in activation of the bleeder. When transistor Q5 650 turns on and voltage across the Zener diode VR2 656 rises above the Zener threshold, capacitor 684 on terminal S 682 of the latch circuit block 680A charges to a threshold and activates and turns on the Darlington pair transistors Q7 685 and Q6 686. This pulls down the terminal $Q^{bar}$ 683 of the latch circuit block 680A. In turn, this provides a base current through resistors 631 and 632 and activates transistor Q8 630 and provides a bleeder activation supply voltage on terminal 690. The bleeder activation supply voltage can be used to activate a bleeder. It is appreciated that the RC filter 688 on the base-emitter terminals of the transistor Q6, 686 reduces noise and improves reliability of the switching performance of bleeder activation supply voltage 690.

Figure 7:
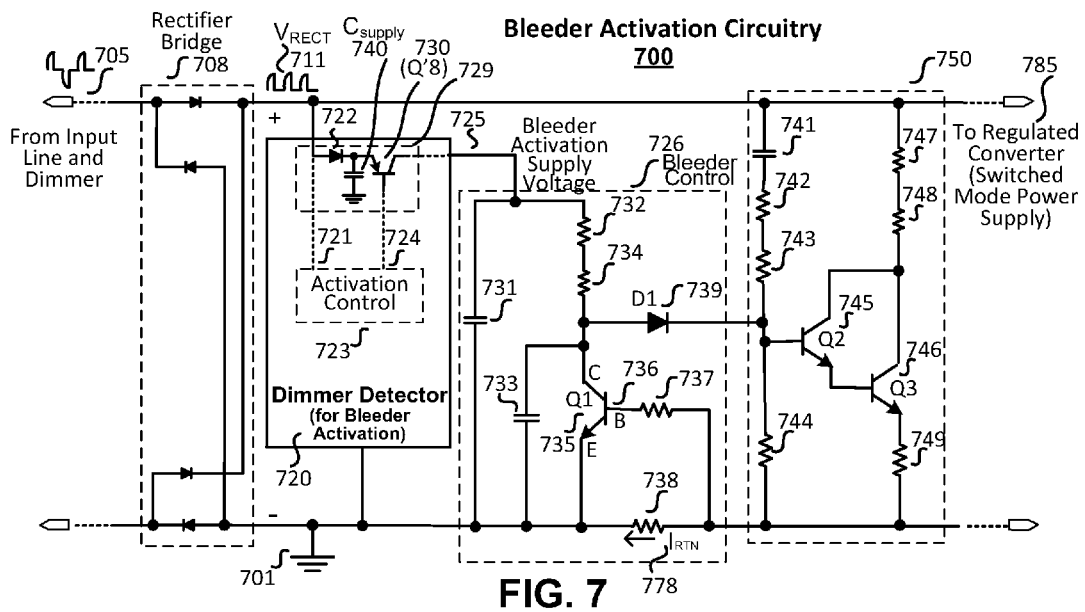
FIG. 7 demonstrates an example circuit schematics of bleeder activation circuitry.

FIG. 7 demonstrates an example circuit schematic of bleeder activation circuitry. In particular, bleeder activation circuitry 700 utilizes the bleeder activation supply voltage from circuit block 600 in FIG. 6 and activating bleeder 740 through interface circuitry as explained below. The phase controlled ac input voltage 705 received from an input line and dimmer is rectified through the rectifier bridge 708 and the rectified input voltage $V_{RECT}$ 711 (referenced to ground 701) is applied to the circuit block 720 dimmer detector for bleeder activation.

Circuit block 720 as explained previously in FIG. 6 includes an activation control block 723 and receives the rectified input voltage $V_{RECT}$ 711 on terminal 721. Below a threshold level, a base signal is generated an transistor Q'8 730 couples a bleeder activation supply voltage 725 to the activation circuitry 726 for the bleeder circuit block 750. It is appreciated that in block 729 of FIG. 7, diode 722 acts in the role of diode 622 of FIG. 6, capacitor 740 acts in the role of $C_{supply}$ 640 in FIG. 6, and transistor Q'8 730 is equivalent to transistor Q8 630 if FIG. 6.

As explained in FIG. 6, when transistor Q'8 turns on, the activation circuitry 726 receives the bleeder activation supply voltage 725 across the capacitor 731. Transistor Q1 735 may receive a base current on its base terminal 736 through resistor 737 as a result of the voltage drop due to LED driver return current $I_{RTN}$ 778 passing through resistor 738 on the return line of the LED driver. As long as the return line current $I_{RTN}$ 778 and the voltage drop due to this current passing through resistor 738 remain below the base-emitter threshold of the transistor Q1 735, transistor Q1 735 remains in OFF state. While transistor Q1 735 is in the OFF state, current through resistors 732 and 734 charges capacitor 733 and provides a base current through diode D1 739 to the transistor Q2 745. In turn, transistor Q2 745 turns transistor Q3 746 ON and activates the sinking of current from the input line through the bleeder resistors 747, 748, and 749. This keeps the input line current above the holding current of Triac dimmer.

It is appreciated that while the activation circuitry 726 responds very efficiently to the trailing-edge phase controlled signals with slow sloped falling edge, leading-edge phase controlled signals with sharp rising edge may require a more rapid edge response. This more rapid response can be provided by different path through capacitor 741 and resistors 742, 743, and 744.

The timing diagrams in FIGS. 8A to 8D illustrate various signals in the bleeder circuit, versus the horizontal time axis 810 in response to both without dimming and with a trailing-edge dimming of the input line signal for the example control circuitry of FIG. 6. In FIG. 8A, $V_{RECT}$ 820 shows an example of a phase controlled rectified input line voltage with sinusoidal variation for a duration of two half-line cycles 811 without dimming. In other words, half-line cycles 811 are complete sinusoidal half-line cycles 823 without any portion of the rectified line signal having been removed. For the following duration 815, trailing-edge dimming is shown for three half-line cycles. A portion 828 of each half-line cycle is removed and the phase controlled portion 826 is applied to the LED driver. The sinusoidal variation of the rectified line voltage is compared with a threshold voltage level 824. Threshold voltage level 824 can be, for example, threshold voltage 564 in FIG. 5B or the base-emitter threshold of transistor Q4 in FIG. 6. During duration 811 (i.e., without dimming), the sinusoidal variation of the line half-cycles 823 is below the threshold level 824 at intervals 813 and transistor Q4 is in OFF state. The collector voltage of transistor Q4, VQ4_collector, is defined by the clamping (threshold) voltage level 845. In the context of FIG. 6, this would be the clamping (threshold) voltage level of the Zener diode VR1 675. However, during intervals such as 842, when the sinusoidal variation of the line half-cycles 823 goes above the threshold level 824, transistor Q4 turns ON and the collector voltage of transistor Q4, VQ4_collector is pulled low.

FIG. 8C $V_{Ctiming}$ 860 shows the voltage across a timing capacitor $C_{timing}$ (e.g., 570 in FIG. 5 or 670 in FIG. 6) that provides activation potential for the bleeder control. During duration 811 (i.e., without dimming) at intervals such as 813 when the sinusoidal variation of the line half-cycles 823 is below the threshold level 824 and transistor Q4 is in the OFF state, the timing capacitor $C_{timing}$ starts charging linearly (863) from the rectified input line signal. However, by proper selection of $R_{timing}$, $C_{timing}$ (and hence the time constant $T_{timing} = R_{timing} \times C_{timing}$ that defines the charging slope of $V_{Ctiming}$ 860) and the higher threshold voltage 824, the maximum charged voltage $V_{Ctiming}$ 860 across the timing capacitor $C_{timing}$ remains below the threshold voltage 824. Threshold Voltage 824 defines the required voltage to turn on transistor Q5, 650 and activate the bleeder control circuit block (726, FIG. 7) by applying bleeder activation supply voltage (725, FIG. 7) that results in activation of the bleeder switching element to sink current from the input line. Without dimming and with a short time interval 813, the maximum charged voltage 864 is below the required duration threshold 872 for activation of the bleeder.

On the other hand, during duration 815 (i.e., with trailing-edge dimming), at intervals such as 817 when the sinusoidal variation of the line half-cycles 823 goes below the threshold level 824 and transistor Q4 is in the OFF state, the duration of the linear charging (867) of the timing capacitor $C_{timing}$ increases. In other words, when time intervals 817 are longer responsive to the removed portion of the rectified line signal being longer, the charge (867) on the timing capacitor $C_{timing}$ reaches the maximum required charged voltage 872 for bleeder activation after a time interval 818. Time interval 818 is shorter than time interval 817.

The graph in FIG. 8D represents the signal bleeder activation supply voltage 880. The signal bleeder activation supply voltage 880 shows the activation (i.e., closing/turning on) of the transistor Q8 630 (FIG. 6) or transistor Q'8 730 (FIG. 7). This applies a supply voltage to the bleeder control circuit block 726 (FIG. 7). Without dimming (duration 811) and as long as the maximum charged voltage of the timing capacitor $C_{timing}$ remains below the duration threshold 872, the transistor Q8 (630 of FIG. 6 or Q'8 730 of FIG. 7) remains in the OFF state and bleeder activation supply voltage (725, FIG. 7) is not applied to the bleeder control circuit block (726, FIG. 7). This condition is represented by a zero level 882. In FIG. 8D, dimming is applied (e.g., duration 815). The removed portion of the rectified line signal increases the charging duration of the timing capacitor $C_{timing}$. If the removed portion is long enough, the charge voltage on the timing capacitor $C_{timing}$ may hit duration threshold 872 and switch transistor Q8 (630 of FIG. 6 or Q'8 730 of FIG. 7) to the ON state. Bleeder activation supply voltage (725, FIG. 7) is then applied to the bleeder control circuit block (726, FIG. 7). This condition is presented by voltage level 884 on the graph bleeder activation supply voltage 880.

It is appreciated that by a proper selection of $R_{timing}$ 672, $C_{timing}$ 670, threshold voltage 824, and duration threshold 872, the LED driver circuit design can be tailored to any desired start/stop operation point for reliable high performance operation of the LED driver with increased efficiency.

Embodiments of the present disclosure may also include: A first method may comprise: receiving a dimmed and rectified line signal, the dimmed and rectified line signal having been dimmed by a dimmer that removes a trailing edge portion of an input line signal; and within a cycle of the dimmed and rectified line signal: beginning a charging of a timing capacitor from a known voltage in response to the dimmed and rectified line signal crossing a threshold, ending the charging of the timing capacitor in response to the dimmed and rectified line signal later again crossing the threshold, during the charging of the timing capacitor, comparing a voltage on the timing capacitor with a threshold voltage, wherein the threshold voltage is set relative to a known voltage so that the voltage on the timing capacitor only crosses the threshold voltage if the rectified line signal is dimmed, and in response to the voltage on the timing capacitor crossing the threshold voltage, triggering a transition of a variable bleeder from a less conductive state into a more conductive state so that the variable bleeder draws a sufficient current in the more conductive state so that at least a holding current of the dimmer is drawn from the dimmer.

The first method may further comprising: storing a supply voltage representative of a peak voltage of the dimmed and rectified line signal on a supply capacitor; and charging of the timing capacitor with charge drawn from the supply capacitor. Also, the first method may further comprising supplying the variable bleeder from the supply capacitor.

Aspects of the present disclosure may also include: A second method comprising: receiving a dimmed and rectified line signal, the dimmed and rectified line signal having been dimmed by a dimmer that removes a portion of an input line signal; storing a supply voltage representative of a peak voltage of the dimmed and rectified line signal on a supply capacitor; timing a duration of the removed portion using a timing capacitor; and in response to the duration of the removed portion exceeding a threshold duration, triggering a transition of a variable bleeder from a less conductive state into a more conductive state so that the variable bleeder draws a sufficient current so that at least a holding current of the dimmer is drawn from the dimmer.

The second method may further comprise supplying circuitry for timing the duration and the variable bleeder from the supply capacitor.

Further aspects of the present disclosure may include: A third method comprising: receiving a dimmed and rectified line signal, the dimmed and rectified line signal having been dimmed by a dimmer that removes a portion of an input line signal; beginning a timing in response to the dimmed and rectified line signal dropping below a threshold; ending the timing in response to the dimmed and rectified line signal later rising above the threshold, the beginning and the ending of the timing yielding a duration; comparing the duration with a threshold duration, wherein the threshold duration is set to be longer than a duration that the rectified line signal would have spent below the threshold had the rectified line signal not been dimmed; and in response to the duration exceeding the threshold duration, triggering a transition of a variable bleeder from a less conductive state into a more conductive state so that the variable bleeder draws a sufficient current so that at least a holding current of the dimmer is drawn from the dimmer.

The third method may further comprise: storing a supply voltage representative of a peak voltage of the dimmed and rectified line signal on a supply capacitor; and supplying circuitry for timing the duration and the variable bleeder from the supply capacitor.

Any of the previously discussed methods may further comprise latching the variable bleeder to draw the sufficient current until the dimmed and rectified line signal is removed. In any of the previously discussed methods the variable bleeder may be coupled to draw the sufficient current for longer than one half of a cycle of the dimmed and rectified line signal. In any of the previously discussed methods the dimmed and rectified line signal may have been dimmed by a dimmer that removes a trailing edge of the input line signal. Any of the previously discussed methods may be performed by any of the apparatus' discussed herein.

Some embodiments provided herein include a switched mode power supply, comprising: a dimmer detector to be coupled to receive a dimmed and rectified input line signal, wherein the dimmer detector is configured to detect an amount of dimming of the dimmed and rectified input line signal and to generate an bleeder activation signal if the amount of dimming exceeds a threshold amount; and a bleeder circuit coupled to selectively draw a bleeder current from the dimmed and rectified input line signal in response to the bleeder activation signal.

The bleeder current of the switched mode power supply may be greater than or equal to a holding current of a dimmer circuit coupled to the input of the switched mode power supply.

The previously discussed dimmer detector may comprise: a first comparator coupled to generate an output that indicates whether an instantaneous magnitude of the dimmed and rectified input line signal is less than a first threshold value; a timing capacitor coupled to be charged while the output of the first comparator indicates that the instantaneous magnitude of the dimmed and rectified input line signal is less than the first threshold value; and a second comparator coupled to generate the bleeder activation signal in response to a voltage on the timing capacitor rising to a second threshold value, wherein the second threshold value is representative of the threshold amount of dimming.

The previously discussed dimmer detector may comprise: a first comparator coupled to generate an output that indicates whether an instantaneous magnitude of the dimmed and rectified input line signal is less than a first threshold value; a timing capacitor coupled to be discharged while the output of the first comparator indicates that the instantaneous magnitude of the dimmed and rectified input line signal is less than the first threshold value; and a second comparator coupled to generate the bleeder activation signal in response to a voltage on the timing capacitor dropping to a second threshold value, wherein the second threshold value is representative of the threshold amount of dimming.

The previously discussed dimmer detector may comprise: a latch to maintain the bleeder activation signal to keep the bleeder circuit activated until the dimmed and rectified input line signal is removed from an input of the switched.

What is claimed is:

1. A circuit for timing a duration of any removed portion of a rectified line signal, the circuit comprising:
   an input to be coupled to receive the rectified line signal;
   a voltage divider coupled to the input to yield a divided rectified line signal;
   a first comparator coupled to compare the divided rectified line signal with a first threshold voltage and to output a comparison result; and
   a timer coupled to the first comparator and responsive to the comparison result to time the duration of the removed portion of the rectified line signal.

2. The circuit of claim 1, wherein the voltage divider is a resistor voltage divider comprising resistors configured and arranged to withstand a rectified line signal voltage.

3. The circuit of claim 1, wherein the timer comprises a timing capacitor coupled to be charged or discharged in response to the comparison result.

4. The circuit of claim 3, wherein the timing capacitor is coupled to be at a timing voltage at an instant that removal of the portion of the rectified line signal begins should the removed portion of the rectified line signal be a trailing edge of the rectified line signal.

5. The circuit of claim 4, wherein the timer further comprises a second comparator coupled to compare the timing voltage on the timing capacitor with a second threshold voltage, wherein the second threshold voltage is set relative to the timing voltage so that the timing voltage on the timing capacitor only crosses the second threshold voltage if the rectified line signal is dimmed by a threshold amount.

6. The circuit of one of claim 1, further comprising:
   a diode having an anode coupled to the input; and
   a supply capacitor coupled to the cathode of the diode to store a supply voltage for supplying the circuit.

* * * * *